United States Patent
Govern et al.

(10) Patent No.: US 7,322,396 B2
(45) Date of Patent: Jan. 29, 2008

(54) WELD CLOSURE OF THROUGH-HOLES IN A NICKEL-BASE SUPERALLOY HOLLOW AIRFOIL

(75) Inventors: Christine Govern, Cincinnati, OH (US); Thomas Joseph Kelly, Cincinnati, OH (US); Joseph Giancarlo Sabato, Morrow, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 11/250,935

(22) Filed: Oct. 14, 2005

(65) Prior Publication Data

US 2007/0084582 A1    Apr. 19, 2007

(51) Int. Cl.
B22D 29/00 (2006.01)
B23K 31/00 (2006.01)

(52) U.S. Cl. ............ 164/122.1; 164/122.2; 164/132; 164/92.1; 228/119; 29/889.1; 148/524; 148/525

(58) Field of Classification Search ............ 164/122.1, 164/122.2, 132, 92.1; 29/889.1; 228/119; 148/524, 525
See application file for complete search history.

(56) References Cited

U.S. PATENT DOCUMENTS

| | | | |
|---|---|---|---|
| 2,821,323 A | | 1/1958 | Lee, II |
| 3,761,201 A | | 9/1973 | Silverstein et al. |
| 4,726,104 A | | 2/1988 | Foster et al. |
| 5,240,491 A | * | 8/1993 | Budinger et al. ............ 75/255 |
| 5,296,308 A | * | 3/1994 | Caccavale et al. .......... 428/586 |
| 5,407,326 A | | 4/1995 | Lardellier |
| 5,505,250 A | * | 4/1996 | Jago ...................... 164/516 |
| 5,780,116 A | * | 7/1998 | Sileo et al. ................ 427/456 |
| 6,193,468 B1 | | 2/2001 | Beeck et al. |
| 6,233,822 B1 | * | 5/2001 | Grossklaus et al. ........ 29/889.1 |
| 6,265,022 B1 | | 7/2001 | Fernihough et al. |
| 6,269,540 B1 | | 8/2001 | Islam et al. |
| 6,283,356 B1 | | 9/2001 | Messelling |
| 6,413,041 B1 | | 7/2002 | Sedillo |
| 6,413,650 B1 | | 7/2002 | Dupree et al. |
| 6,454,156 B1 | * | 9/2002 | Taras et al. ................. 228/165 |
| 6,516,865 B1 | | 2/2003 | Beeck et al. |
| 6,565,680 B1 | | 5/2003 | Jackson et al. |
| 6,596,963 B2 | | 7/2003 | Kelly |
| 6,615,470 B2 | | 9/2003 | Corderman et al. |
| 6,673,169 B1 | * | 1/2004 | Peterson et al. ............ 148/524 |
| 6,824,359 B2 | * | 11/2004 | Chlus et al. ................. 416/92 |
| 6,883,700 B2 | | 4/2005 | Kottilingham et al. |

(Continued)

FOREIGN PATENT DOCUMENTS

EP    1396299 A1    3/2004

*Primary Examiner*—Jonathan Johnson
*Assistant Examiner*—I.-H. Lin
(74) *Attorney, Agent, or Firm*—McNees Wallace & Nurick, LLC

(57) ABSTRACT

A hollow airfoil is fabricated by providing a casting mold assembly including a casting mold, a casting core, and a standoff spacer that prevents the casting core from contacting the casting mold to define a casting space. A first nickel-base superalloy is cast into the casting space and solidified to form the hollow airfoil. The presence of a through-hole extending through a wall of the hollow airfoil is identified, and the through-hole is closed by welding using a second nickel-base superalloy, without using any free-standing closure element.

20 Claims, 3 Drawing Sheets

U.S. PATENT DOCUMENTS

2003/0034379 A1  2/2003  Jackson et al.
2003/0041436 A1  3/2003  Kelly et al.
2003/0042233 A1  3/2003  Kelly

* cited by examiner

WELD CLOSURE OF THROUGH-HOLES IN A NICKEL-BASE SUPERALLOY HOLLOW AIRFOIL

This invention relates to the production of a cast hollow airfoil such as a gas turbine blade and, more particularly, to the closure of a hole that extends through the wall of the airfoil after the casting is complete.

BACKGROUND OF THE INVENTION

In an aircraft gas turbine (jet) engine, air is drawn into the front of the engine, compressed by a shaft-mounted compressor, and mixed with fuel. The mixture is burned, and the hot combustion gases are passed through a turbine mounted on the same shaft. The flow of combustion gas turns the turbine by impingement against an airfoil section of the turbine blades and vanes, which turns the shaft and provides power to the compressor and fan. In a more complex version of the gas turbine engine, the compressor and a high pressure turbine are mounted on one shaft, and the fan and low pressure turbine are mounted on a separate shaft. The hot exhaust gases flow from the back of the engine, driving it and the aircraft forward.

According to thermodynamic principles, the hotter the combustion gases and the exhaust gases, the greater the thermodynamic efficiency of the gas turbine engine. There is an incentive to increase the temperature of the combustion gas. The combustion-gas temperature cannot be raised to an arbitrarily high value, because of the operating temperature limits on the materials of construction of the gas turbine engine.

To allow the combustion and exhaust gas temperatures to be raised as high as possible, several materials and design innovations have been made. The superalloy materials themselves have been improved. The materials in the hottest portions of the gas turbine engine are now made by casting, rather than a wrought process. Single-crystal and oriented-crystal casting is employed.

In another important advance, high-temperature components such as turbine blades for aircraft gas turbines are made hollow so that a flow of cooling air may be directed through the interior of the hollow component during operation. The cooling air flows through the interior and then escapes through openings in the surface of the component at carefully selected locations. The cooling air reduces the temperature of the metal, and allows the combustion gas to be at a higher temperature. The hollow component also has a reduced weight compared to a solid component, an important consideration for any aircraft component but particularly for rotating components.

The hollow turbine blade is typically made by placing a casting core inside a larger-size die, and injecting wax into the space between the casting core and the die. The die is removed, and a ceramic-shell casting mold is formed over the wax. The wax is removed, leaving a casting space between the casting core and the ceramic-shell casting mold. Molten casting metal is poured into the casting space between the casting core and the ceramic-shell casting mold.

The casting core is prevented from touching the inner wall of the ceramic shell by standoff spacers extending between the two. These standoff spacers may, however, undesirably extend through the wall of the completed hollow airfoil, leaving a hole therethrough. Any cooling air that flows through such through-holes may reduce the cooling efficiency and the overall performance of the hollow component, if that cooling air flow out of the hollow component is not at the carefully selected locations that maximize the effect of the cooling air in improving performance. The through-holes also potentially compromise the mechanical performance of the article, by providing a source of weakness and possible premature failure.

Several approaches have been used to deal with this problem. In one, the through-holes are ignored, and the loss in cooling efficiency is accepted. In another, larger through-holes are plugged, and smaller through-holes are ignored. This achieves a partial solution. The plugging techniques typically involve drilling out the through-hole to a standard size, inserting a freestanding plug into the through-hole or placing a freestanding platelet closure over the through-hole, and then welding the plug or closure in place. This approach is difficult to apply to smaller-size through-holes, due to the amount of labor involved.

These approaches either achieve only a partial solution, or the solution is expensive and laborious. Mechanical properties are often compromised, because the welding of the inserted plug or platelet may leave a heat-affected zone that cannot be properly heat treated.

Accordingly, there is a need for an improved approach to the sealing of such through-holes. The present invention fulfills this need, and further provides related advantages.

SUMMARY OF THE INVENTION

The present approach provides a repair technique for through-holes in a hollow airfoil, such as those which result from the standoff spacers used in the casting of hollow-core nickel-base superalloy components. The hollow components are cast using a casting core and with standoff spacers. Any post-casting through-holes are closed by direct welding and without the use of any freestanding closure or plug element. The present approach is relatively economical to practice, and produces a final article that does not have the through-holes and also has very little, if any, reduction in mechanical and physical properties as compared with a part that did not have any through-holes. There is good adhesion between the weld alloy and the casting alloy, there is little heat-affected zone produced in the welding, and the weld alloy may be heat treated using the same temperature/time cycle as the casting alloy. The welded area is compatible with coatings such as environmental coatings and thermal barrier coatings that are applied to high-temperature components. The component having the welded holes has good environmental properties, and specifically has little if any reduction in oxidation and corrosion resistance as compared with the base metal of the component.

A method for fabricating a hollow airfoil comprises the steps of providing a casting mold assembly comprising a casting mold with an inner wall, a casting core that is received within the inner wall of the casting mold to leave a casting space between an outer wall of the casting core and the inner wall of the casting mold, wherein the casting space defines a portion of a hollow airfoil, and a standoff spacer that prevents the casting core from contacting the inner wall of the casting mold and thereby maintains the casting space. The casting mold assembly is preferably for an aircraft gas turbine engine airfoil, and most preferably for an aircraft gas turbine engine turbine blade airfoil. The standoff spacer may be a protrusion from and integral with the casting core, or it may be a chaplet. The chaplet is a freestanding element separate from the casting core. The chaplet extends between the casting core and the casting mold and mechanically holds the casting core in place and positionally stabilizes the casting core relative to the casting mold prior to and during casting.

A nickel-base superalloy casting alloy is cast into the casting space and solidified to form the hollow airfoil. Examples of casting alloys of interest include Rene™ N5, Rene™ N6, and Rene™ 142, but the use of the present approach is not limited to these alloys. The hollow airfoil is separated from the casting mold assembly.

The presence of a through-hole extending through a wall of the airfoil that is present due to the standoff spacer is identified. The through-hole may be of any operable size, but desirably the through-hole has a maximum transverse dimension of not more than about 0.030 inch at the location where the hole intersects an external surface of the airfoil. The present approach is operable with holes larger than about 0.030 inch, but the present approach finds its greatest utility with smaller holes because larger holes may be repaired with other techniques.

If there is a through-hole present, the through-hole is welded by closing the through-hole with a weld alloy different from the casting alloy. Examples of such weld alloys include (1) an alloy having a nominal composition, in weight percent, 0.01-0.03 percent carbon, 0.1 percent maximum manganese, 0.5-0.6 percent silicon, 0.01 percent maximum phosphorus, 0.004 percent maximum sulfur, 7.4-7.8 percent chromium, 2.9-3.3 percent cobalt, 0.10 percent maximum molybdenum, 3.7-4.0 percent tungsten, 5.3-5.6 percent tantalum, 0.02 percent maximum titanium, 7.6-8.0 percent aluminum, 1.5-1.8 percent rhenium, 0.005 percent maximum selenium, 0.3 percent maximum platinum, 0.01-0.02 percent boron, 0.03 percent maximum zirconium, 0.12-0.18 percent hafnium, 0.1 percent maximum niobium, 0.1 percent maximum vanadium, 0.1 percent maximum copper, 0.2 percent maximum iron, 0.0035 percent maximum magnesium, 0.01 percent maximum oxygen, 0.01 percent maximum nitrogen, balance nickel with other elements 0.5 percent maximum, (2) an alloy having a nominal composition in weight percent of about 7.5 percent cobalt, about 7.0 percent chromium, about 1.5 percent molybdenum, about 5 percent tungsten, about 3 percent rhenium, about 6.5 percent tantalum, about 6.2 percent aluminum, about 0.15 percent hafnium, about 0.05 percent carbon, about 0.004 percent boron, about 0.01 percent yttrium, balance nickel and minor elements; and (3) an alloy having a nominal composition in weight percent of about 12.0 percent cobalt, about 6.8 percent chromium, about 1.5 percent molybdenum, about 4.9 percent tungsten, about 2.8 percent rhenium, about 6.35 percent tantalum, about 6.15 percent aluminum, about 1.5 percent hafnium, about 0.12 percent carbon, about 0.015 percent boron, balance nickel and minor elements. The welding closed of the through-hole is accomplished without using any freestanding closure element such as a plug or a cover plate. Operable welding techniques include microplasma welding, plasma welding, and gas tungsten arc or tungsten inert gas welding, with microplasma welding being preferred.

In another embodiment, the weld alloy is selected responsive to the composition and properties of the casting alloy. The weld alloy is selected to have oxidation resistance and coating compatibility at least as good as that of the casting alloy. The weld alloy is selected to have a weld alloy solidus temperature in the range of from 150° F. below the casting alloy solidus temperature to 30° F. above the casting alloy solidus temperature.

Typically, after the welding, the hollow airfoil, including both the casting alloy and the welding alloy, is heat treated using the heat treatment appropriate for the base alloy that is the casting alloy composition. Coatings such as environmental coatings or thermal protective coatings may be applied over both the casting alloy and the welding alloy. The surface of the airfoil is normally machined or ground, and polished, either before or after the heat treatment to attain the desired shape of the airfoil surface.

The present approach provides a technique for fabricating a hollow airfoil, including repairing of any through-holes that result from the casting-core standoff spacers during the casting operation. The repair is achieved by welding using a nickel-base superalloy welding alloy that, after heat treatment, achieves nearly the same mechanical properties as the base metal casting alloy, with minimal heat-affected zone.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
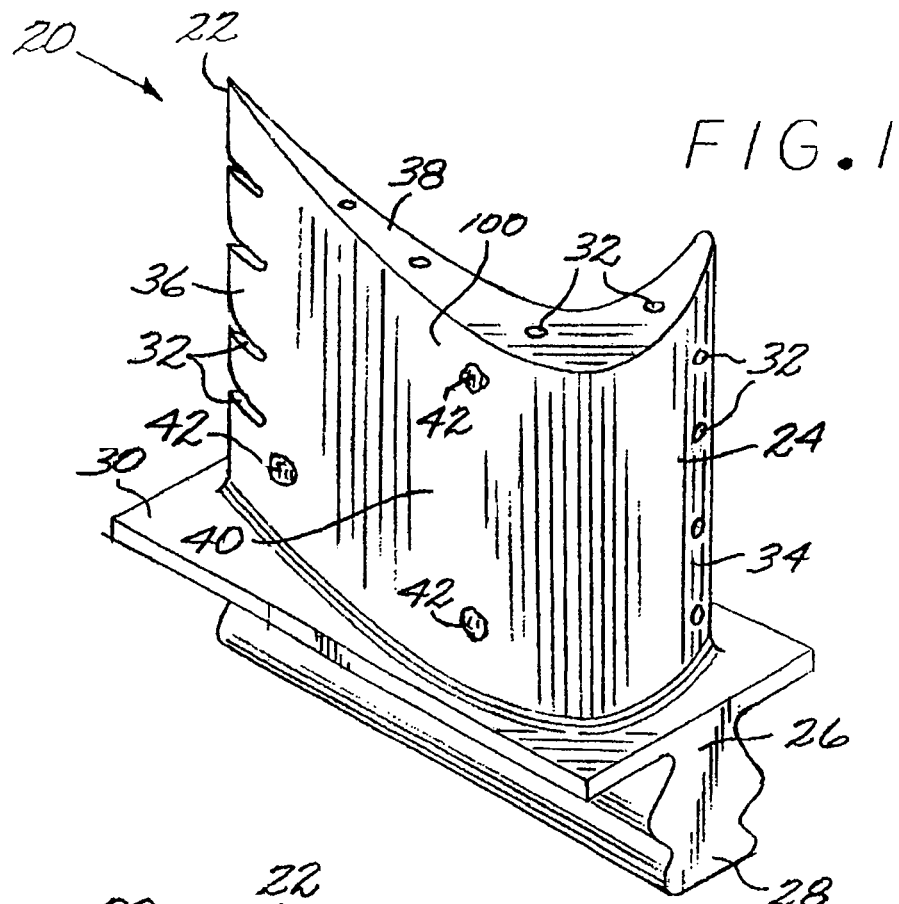
FIG. 1 is a perspective view of a cast component gas turbine blade having a hollow airfoil section.

FIG. 1 depicts a cast hollow component 20, in this case a hollow gas turbine blade 22. The gas turbine blade 22 has a hollow airfoil 24 against which a flow of hot combustion gas impinges during service operation, a downwardly extending shank 26, and an attachment in the form of a dovetail 28, which attaches the gas turbine blade 22 to a gas turbine disk (not shown) of the gas turbine engine. A platform 30 extends transversely outwardly at a location between the airfoil 24, and the shank 26 and dovetail 28. The gas turbine blade 22 is hollow, so that in service cooling air may flow from an interior of the dovetail 28, which communicates with a cooling-air manifold, through an interior of the shank 26, and through an interior of the airfoil 24. The cooling air leaves the interior of the gas turbine blade 22 through carefully positioned cooling openings 32 in the leading edge 34, the trailing edge 36, and the blade tip 38, and possibly on the lateral surfaces of the airfoil 24. There are sometimes other through-holes produced in the walls 40 of the airfoil 24, which by the present approach described next are welded closed by weldments 42.

Figure 2:
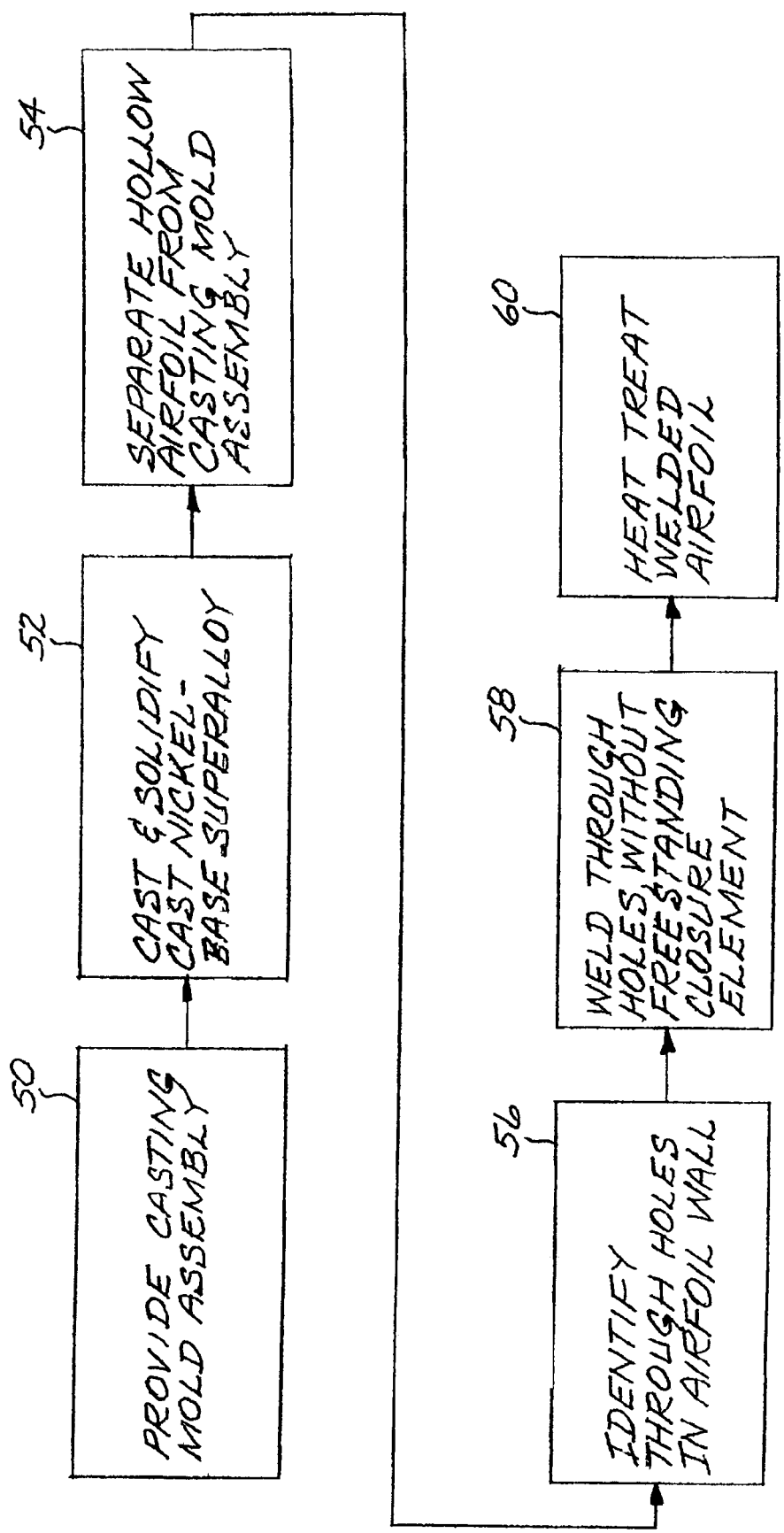
FIG. 2 is a block flow diagram of a method for fabricating a hollow airfoil.
Figure 3:
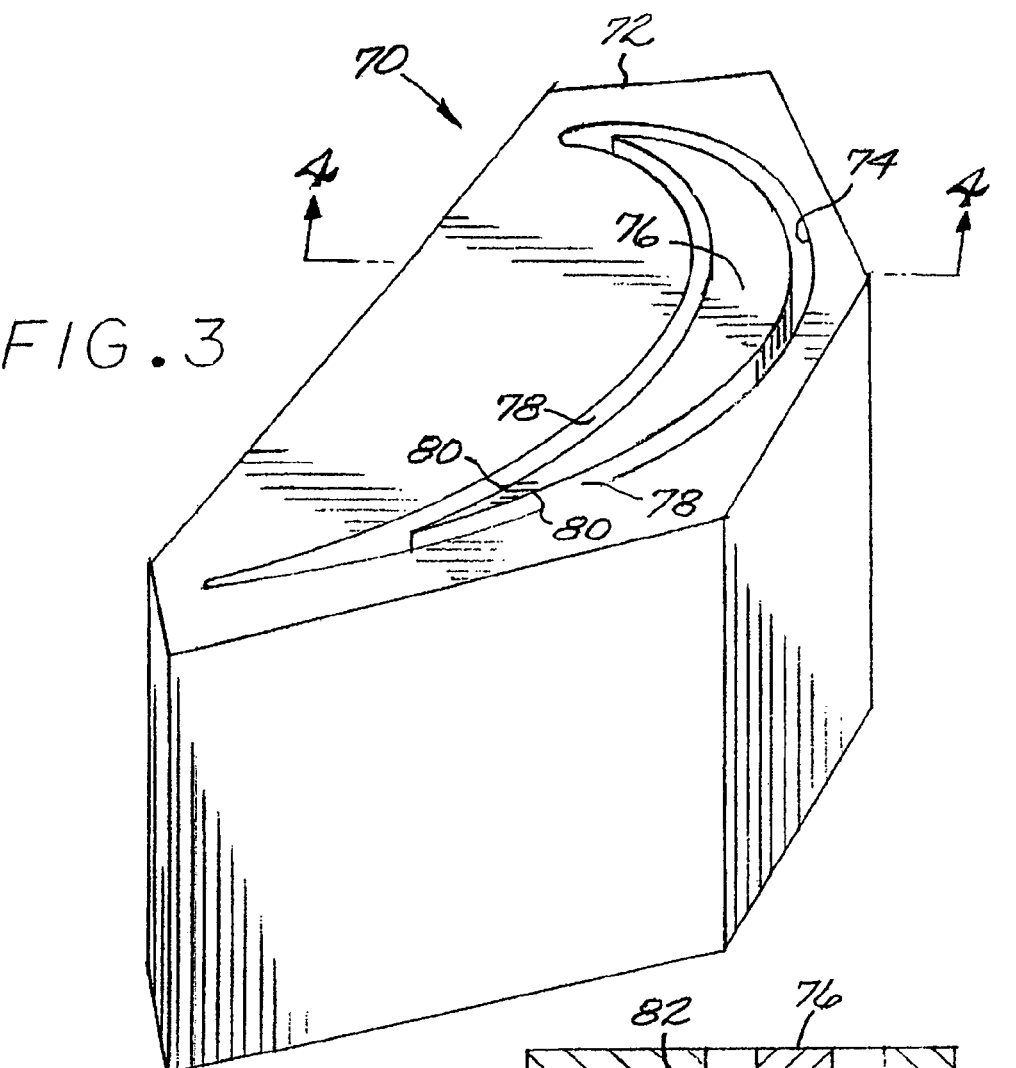
FIG. 3 is a perspective view of a casting mold assembly.
Figure 4:
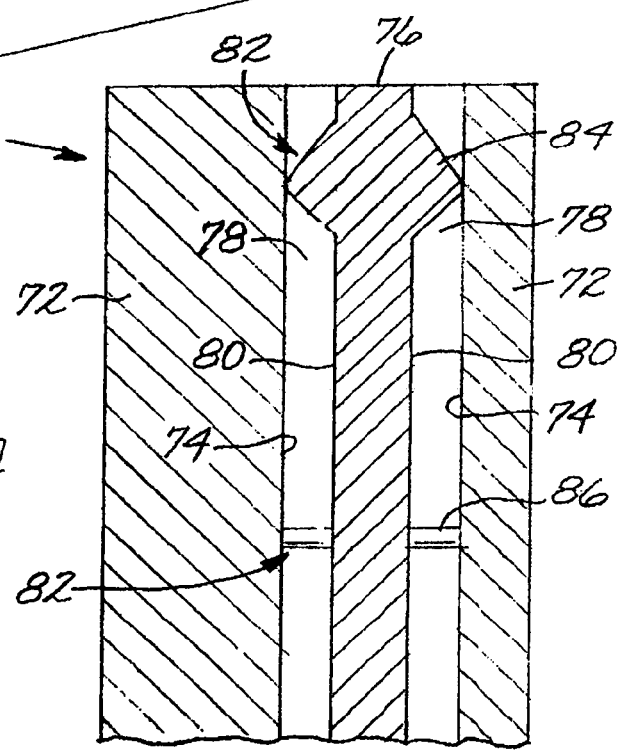
FIG. 4 is a sectional view of an airfoil portion of the casting mold assembly of FIG. 3, taken on line 4-4.

FIG. 2 depicts a method for fabricating the hollow component 20, and specifically the hollow airfoil 24 of the hollow gas turbine blade 22. A casting mold assembly 70 is provided, step 50. FIG. 3 shows the casting mold assembly 70 in perspective view, and FIG. 4 shows the casting mold assembly 70 in sectional view. The casting mold assembly 70 includes a ceramic-shell casting mold 72 with an inner wall 74. A casting core 76 is received within the volume defined by the inner wall 74 of the ceramic-shell casting mold 72 to leave a casting space 78 between an outer wall 80 of the casting core 76 and the inner wall 74 of the ceramic-shell casting mold 72. The casting space 78 defines a portion of the hollow airfoil 24.

The casting core 76 would ideally remain in its desired position during a subsequent casting operation. In practice, however, it may shift its position unless a mechanical structure is provided to hold it in its desired position within the casting mold 70. A standoff spacer 82 prevents the casting core 76 from contacting the inner wall 74 of the ceramic-shell casting mold 72 and thereby maintains the desired thickness of the casting space 78 and thence of the wall 40 of the hollow airfoil 24. The standoff spacer 82 may be of any operable form. FIG. 4 illustrates two types of standoff spacers 82 in a single casting mold assembly 70, although a single type of standoff spacers 82 could be used throughout each casting mold assembly 70. One illustrated type of standoff spacer 82 is a protrusion or bump 84 integral with and extending outwardly from the outer wall 80 of the casting core 76.

Another type of standoff spacer 82 is a chaplet 86 of uniform cross-sectional size. The chaplet 86 is a freestanding element separate from the casting core 76. The chaplet 86 is positioned to extend between the casting core 76 and the casting mold 72, and mechanically holds the casting core 76 in place and positionally stabilizes the casting core 76 relative to the casting mold 72 prior to and during casting. The chaplet 86 is typically made of quartz, a ceramic, or other material that does not melt or dissolve during the metal casting. The present approach encourages the use of chaplets 86 to positionally stabilize the casting core 76, because the chaplet is of a standardized size and produces a standard-size through-hole extending through the wall 40 of the hollow airfoil 24.

A nickel-base superalloy casting alloy is cast into the casting space 78 and solidified to form the base metal of the hollow airfoil 24, step 52. A nickel-base alloy has more nickel than any other element, and a nickel-base superalloy is a nickel-base alloy that is strengthened by the precipitation of gamma-prime phase or a related phase. Example of nickel-base superalloy casting alloys with which the present invention may be used are (1) Rene™ N5, having a nominal composition in weight percent of about 7.5 percent cobalt, about 7.0 percent chromium, about 1.5 percent molybdenum, about 5 percent tungsten, about 3 percent rhenium, about 6.5 percent tantalum, about 6.2 percent aluminum, about 0.15 percent hafnium, about 0.05 percent carbon, about 0.004 percent boron, about 0.01 percent yttrium, balance nickel and minor elements; (2) Rene™ 142, having a nominal composition in weight percent of about 12.0 percent cobalt, about 6.8 percent chromium, about 1.5 percent molybdenum, about 4.9 percent tungsten, about 2.8 percent rhenium, about 6.35 percent tantalum, about 6.15 percent aluminum, about 1.5 percent hafnium, about 0.12 percent carbon, about 0.015 percent boron, balance nickel and minor elements; and (3) Rene™ N6, having a nominal composition in weight percent of about 12.5 percent cobalt, about 4.2 percent chromium, about 1.4 percent molybdenum, about 5.75 percent tungsten, about 5.4 percent rhenium, about 7.2 percent tantalum, about 5.75 percent aluminum, about 0.15 percent hafnium, about 0.05 percent carbon, about 0.004 percent boron, about 0.01 percent yttrium, balance nickel and incidental impurities. The solidification may be conducted so that the grain structure of the hollow airfoil 24 is equiaxed, directional, or single crystal, using techniques known in the art.

The hollow airfoil 24 is separated from the casting mold assembly, step 54.

Figure 5:
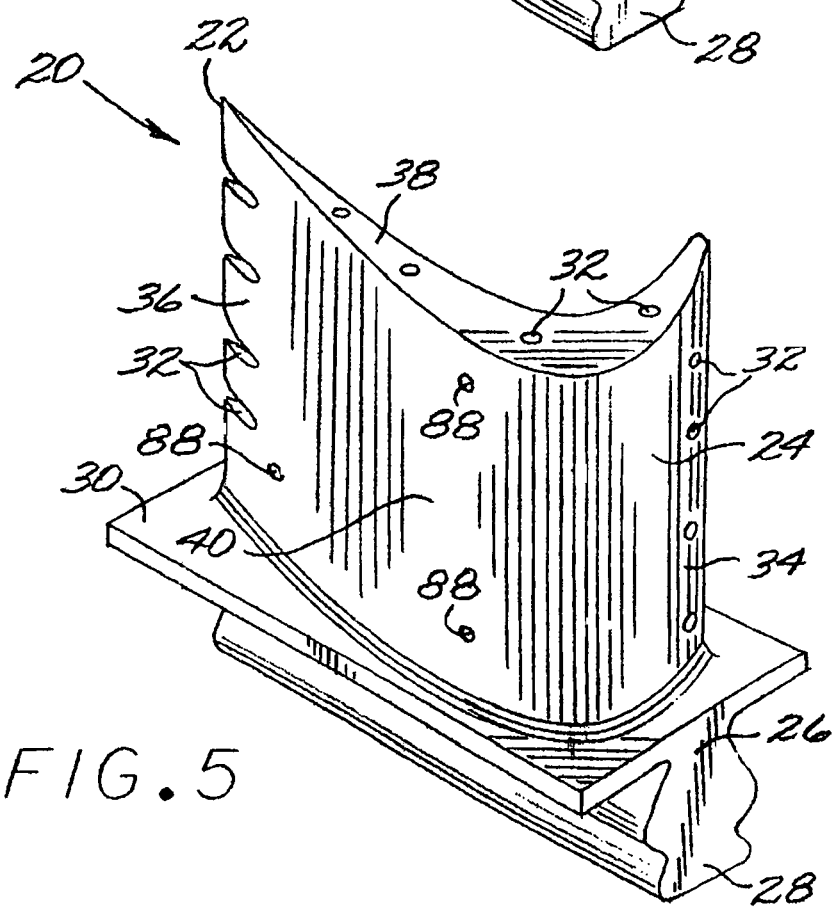
FIG. 5 is a perspective view of the cast hollow component of FIG. 1, after casting and prior to welding.

The presence, if any, of a through-hole 88 (shown in FIG. 5) extending through the wall 40 of the hollow airfoil 24 that is present due to the standoff spacer is identified, step 56. A through-hole 88 is a hole extending through the entire thickness of the wall 40 so that, in later service, air could leak from the interior of the hollow turbine blade 22 at an undesired location. Ideally, there would be no such through-holes 88 at all, but in practice through-holes 88 are found in some of the hollow turbine blades 22. FIG. 5 illustrates three such through-holes 88, corresponding to the locations of the weldments 42 in FIG. 1.

The through-hole 88 in some cases may have a maximum transverse dimension of not more than about 0.030 inch at the location where the through-hole 88 intersects an external surface of the hollow airfoil 24. Such small through-holes are difficult to close by plug-type techniques. Additionally, most nickel-base superalloys cannot be used to close such small holes by direct welding techniques, because the molten weld metal will not flow into the small-size through-hole even when assisted by capillary action, and because the final weldment is not heat treatable by the same heat treatment used for the nickel-base superalloy casting alloy that is the base metal of the body of the hollow airfoil 24.

If there is a through-hole 88 present, the through-hole is welded closed with a weld alloy that is a nickel-base superalloy welding alloy, step 58, and is different from the base metal that is of the composition of the casting alloy. The closure or plugging of the through-hole 88 is accomplished without the use of any freestanding closure element such as a plug or plate. Preferably, the welding alloy is (1) an alloy having a nominal composition, in weight percent, 0.01-0.03 percent carbon, 0.1 percent maximum manganese, 0.5-0.6 percent silicon, 0.01 percent maximum phosphorus, 0.004 percent maximum sulfur, 7.4-7.8 percent chromium, 2.9-3.3 percent cobalt, 0.10 percent maximum molybdenum, 3.7-4.0 percent tungsten, 5.3-5.6 percent tantalum, 0.02 percent maximum titanium, 7.6-8.0 percent aluminum, 1.5-1.8 percent rhenium, 0.005 percent maximum selenium, 0.3 percent maximum platinum, 0.01-0.02 percent boron, 0.03 percent maximum zirconium, 0.12-0.18 percent hafnium, 0.1 percent maximum niobium, 0.1 percent maximum vanadium, 0.1 percent maximum copper, 0.2 percent maximum iron, 0.0035 percent maximum magnesium, 0.01 percent maximum oxygen, 0.01 percent maximum nitrogen, balance nickel with other elements 0.5 percent maximum, (2) an alloy having a nominal composition in weight percent of about 7.5 percent cobalt, about 7.0 percent chromium, about 1.5 percent molybdenum, about 5 percent tungsten, about 3 percent rhenium, about 6.5 percent tantalum, about 6.2 percent aluminum, about 0.15 percent hafnium, about 0.05 percent carbon, about 0.004 percent boron, about 0.01 percent yttrium, balance nickel and minor elements; or (3) an alloy having a nominal composition in weight percent of about 12.0 percent cobalt, about 6.8 percent chromium, about 1.5 percent molybdenum, about 4.9 percent tungsten, about 2.8 percent rhenium, about 6.35 percent tantalum, about 6.15 percent aluminum, about 1.5 percent hafnium, about 0.12 percent carbon, about 0.015 percent boron, balance nickel and minor elements. There is no freestanding closure element. Any operable welding technique may be used, but microplasma, plasma, and gas tungsten arc or tungsten inert gas approaches are preferred.

The result is that the through-holes 88 of FIG. 5 are closed by the weldments 42 of FIG. 1. The weldments 42 need not extend along the entire through-thickness length of the respective through-holes 88. For most applications, the weldment 42 need only close the through-hole 88 in a gas-tight manner.

In most cases, the hollow airfoil 24, with its weldments 42, if any, are thereafter heat treated, step 60. The heat treatment is that selected for the base metal casting alloy. This heat treatment is also operable for the weld alloy.

Other processing may be used as well, either before or after heat treating. For example, coatings 100 such as environmental coatings and thermal barrier coatings may be applied overlying the component 20 and the weldments 42. The coatings 100 adhere well to both the casting alloy that forms the body of the component 20 and also to the weldment 42, providing both with the desired protection at elevated temperatures. Environmental coatings include, for example, diffusion aluminides and composition-modified aluminides (such as platinum aluminides and the like), and overlay coatings such as NiCrAlY coatings and the like. Thermal barrier coatings such as yttria-stabilized zirconia may optionally be applied overlying the environmental coatings (which are then termed bond coats).

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A method for fabricating a hollow airfoil, comprising the steps of
   providing a casting mold assembly comprising
      a casting mold with an inner wall,
      a casting core that is received within the inner wall of the casting mold to leave a casting space between an outer wall of the casting core and the inner wall of the casting mold, wherein the casting space defines a portion of the hollow airfoil, and
      a standoff spacer that prevents the casting core from contacting the inner wall of the casting mold and thereby maintains the casting space;
   casting a nickel-base superalloy casting alloy into the casting space and solidifying the cast nickel-base superalloy casting alloy to form the hollow airfoil;
   separating the hollow airfoil from the casting mold assembly;
   identifying the presence of a through hole extending through a wall of the hollow airfoil that is present due to the standoff spacer; and, if there is a through hole present,
   welding the through hole by closing the through hole with a weld alloy different from the casting alloy and selected from the group consisting of (1) an alloy having a nominal composition, in weight percent, 0.01-0.03 percent carbon, 0.1 percent maximum manganese, 0.5-0.6 percent silicon, 0.01 percent maximum phosphorus, 0.004 percent maximum sulfur, 7.4-7.8 percent chromium, 2.9-3.3 percent cobalt, 0.10 percent maximum molybdenum, 3.7-4.0 percent tungsten, 5.3-5.6 percent tantalum, 0.02 percent maximum titanium, 7.6-8.0 percent aluminum, 1.5-1.8 percent rhenium, 0.005 percent maximum selenium, 0.3 percent maximum platinum, 0.01-0.02 percent boron, 0.03 percent maximum zirconium, 0.12-0.18 percent hafnium, 0.1 percent maximum niobium, 0.1 percent maximum vanadium, 0.1 percent maximum copper, 0.2 percent maximum iron, 0.0035 percent maximum magnesium, 0.01 percent maximum oxygen, 0.01 percent maximum nitrogen, balance nickel with other elements 0.5 percent maximum; (2) an alloy having a nominal composition in weight percent of about 7.5 percent cobalt, about 7.0 percent chromium, about 1.5 percent molybdenum, about 5 percent tungsten, about 3 percent rhenium, about 6.5 percent tantalum, about 6.2 percent aluminum, about 0.15 percent hafnium, about 0.05 percent carbon, about 0.004 percent boron, about 0.01 percent yttrium, balance nickel and minor elements; and (3) an alloy having a nominal composition in weight percent of about 12.0 percent cobalt, about 6.8 percent chromium, about 1.5 percent molybdenum, about 4.9 percent tungsten, about 2.8 percent rhenium, about 6.35 percent tantalum, about 6.15 percent aluminum, about 1.5 percent hafnium, about 0.12 percent carbon, about 0.015 percent boron, balance nickel and minor elements.

2. The method of claim 1, wherein the step of providing includes the step of
   providing the casting mold assembly for an aircraft gas turbine engine hollow airfoil.

3. The method of claim 1, wherein the step of providing includes the step of
   providing the casting mold assembly for an aircraft gas turbine engine turbine blade hollow airfoil.

4. The method of claim 1, wherein the step of providing the casting mold includes the step of
   providing the standoff spacer as a protrusion from and integral with the casting core.

5. The method of claim 1, wherein the step of providing the casting mold includes the step of
   providing the standoff spacer as a chaplet.

6. The method of claim 1, wherein the step of casting the nickel-base superalloy includes the step of
   casting a casting alloy selected from the group consisting of (1) an alloy having a nominal composition in weight percent of about 7.5 percent cobalt, about 7.0 percent chromium, about 1.5 percent molybdenum, about 5 percent tungsten, about 3 percent rhenium, about 6.5 percent tantalum, about 6.2 percent aluminum, about 0.15 percent hafnium, about 0.05 percent carbon, about 0.004 percent boron, about 0.01 percent yttrium, balance nickel and minor elements; (2) an alloy having a nominal composition in weight percent of about 12.0 percent cobalt, about 6.8 percent chromium, about 1.5 percent molybdenum, about 4.9 percent tungsten, about 2.8 percent rhenium, about 6.35 percent tantalum, about 6.15 percent aluminum, about 1.5 percent hafnium, about 0.12 percent carbon, about 0.015 percent boron, balance nickel and minor elements; and (3) an alloy having a nominal composition in weight percent of about 12.5 percent cobalt, about 4.2 percent chromium, about 1.4 percent molybdenum, about 5.75 percent tungsten, about 5.4 percent rhenium, about 7.2 percent tantalum, about 5.75 percent aluminum, about 0.15 percent hafnium, about 0.05 percent carbon, about 0.004 percent boron, about 0.01 percent yttrium, balance nickel and incidental impurities.

7. The method of claim 1, wherein the step of identifying includes the step of
   identifying the through hole having a maximum transverse dimension of not more than about 0.030 inch where the through hole intersects an external surface of the hollow airfoil.

8. The method of claim 1, wherein the step of welding includes the step of welding by microplasma welding, plasma welding, and gas tungsten arc or tungsten inert gas welding.

9. The method of claim 1, including an additional step, after the step of welding, of heat treating the hollow airfoil.

10. The method of claim 1, including an additional step, performed after the step of welding, of applying a coating overlying the casting alloy and overlying the weld alloy.

11. The method of claim 1, wherein the step of welding includes the step of welding the through hole by closing the through hole with a weld alloy, and without using any freestanding closure element.

12. A method for fabricating a hollow airfoil, comprising the steps of providing a casting mold assembly for an aircraft gas turbine hollow airfoil comprising a casting mold with an inner wall, a casting core that is received within the inner wall of the casting mold to leave a casting space between an outer wall of the casting core and the inner wall of the casting mold, wherein the casting space defines a portion of the hollow airfoil, and a standoff spacer that prevents the casting core from contacting the inner wall of the casting mold and thereby maintains the casting space;

casting a nickel-base superalloy casting alloy into the casting space and solidifying the cast nickel-base superalloy to form the hollow airfoil;

separating the hollow airfoil from the casting mold assembly;

identifying the presence of a through hole extending through a wall of the hollow airfoil that is present due to the standoff spacer, wherein the through hole has a maximum transverse dimension of not more than about 0.030 inch where the through hole intersects an external surface of the hollow airfoil; and, if there is a through hole present, welding the through hole by closing the through hole with a weld alloy different from the casting alloy and selected from the group consisting of (1) an alloy having a nominal composition, in weight percent, 0.01-0.03 percent carbon, 0.1 percent maximum manganese, 0.5-0.6 percent silicon, 0.01 percent maximum phosphorus, 0.004 percent maximum sulfur, 7.4-7.8 percent chromium, 2.9-3.3 percent cobalt, 0.10 percent maximum molybdenum, 3.7-4.0 percent tungsten, 5.3-5.6 percent tantalum, 0.02 percent maximum titanium, 7.6-8.0 percent aluminum, 1.5-1.8 percent rhenium, 0.005 percent maximum selenium, 0.3 percent maximum platinum, 0.01-0.02 percent boron, 0.03 percent maximum zirconium, 0.12-0.18 percent hafnium, 0.1 percent maximum niobium, 0.1 percent maximum vanadium, 0.1 percent maximum copper, 0.2 percent maximum iron, 0.0035 percent maximum magnesium, 0.01 percent maximum oxygen, 0.01 percent maximum nitrogen, balance nickel with other elements 0.5 percent maximum; (2) an alloy having a nominal composition in weight percent of about 7.5 percent cobalt, about 7.0 percent chromium, about 1.5 percent molybdenum, about 5 percent tungsten, about 3 percent rhenium, about 6.5 percent tantalum, about 6.2 percent aluminum, about 0.15 percent hafnium, about 0.05 percent carbon, about 0.004 percent boron, about 0.01 percent yttrium, balance nickel and minor elements; and (3) an alloy having a nominal composition in weight percent of about 12.0 percent cobalt, about 6.8 percent chromium, about 1.5 percent molybdenum, about 4.9 percent tungsten, about 2.8 percent rhenium, about 6.35 percent tantalum, about 6.15 percent aluminum, about 1.5 percent hafnium, about 0.12 percent carbon, about 0.015 percent boron, balance nickel and minor elements.

13. The method of claim 12, wherein the step of providing the casting mold includes the step of providing the standoff spacer as a protrusion from and integral with the casting core.

14. The method of claim 12, wherein the step of providing the casting mold includes the step of providing the standoff spacer as a chaplet.

15. The method of claim 12, wherein the step of casting the nickel-base superalloy includes the step of casting a casting alloy selected from the group consisting of (1) an alloy having a nominal composition in weight percent of about 7.5 percent cobalt, about 7.0 percent chromium, about 1.5 percent molybdenum, about 5 percent tungsten, about 3 percent rhenium, about 6.5 percent tantalum, about 6.2 percent aluminum, about 0.15 percent hafnium, about 0.05 percent carbon, about 0.004 percent boron, about 0.01 percent yttrium, balance nickel and minor elements; (2) an alloy having a nominal composition in weight percent of about 12.0 percent cobalt, about 6.8 percent chromium, about 1.5 percent molybdenum, about 4.9 percent tungsten, about 2.8 percent rhenium, about 6.35 percent tantalum, about 6.15 percent aluminum, about 1.5 percent hafnium, about 0.12 percent carbon, about 0.015 percent boron, balance nickel and minor elements; and (3) an alloy having a nominal composition in weight percent of about 12.5 percent cobalt, about 4.2 percent chromium, about 1.4 percent molybdenum, about 5.75 percent tungsten, about 5.4 percent rhenium, about 7.2 percent tantalum, about 5.75 percent aluminum, about 0.15 percent hafnium, about 0.05 percent carbon, about 0.004 percent boron, about 0.01 percent yttrium, balance nickel and incidental impurities.

16. The method of claim 12, wherein the step of welding includes the step of welding by microplasma welding, plasma welding, and gas tungsten arc or tungsten inert gas welding.

17. The method of claim 12, including an additional step, performed after the step of welding, of applying a coating overlying the casting alloy and overlying the weld alloy.

18. The method of claim 12, wherein the step of welding includes the step of welding the through hole by closing the through hole with a weld alloy, and without using any freestanding closure element.

19. A method for fabricating a hollow airfoil, comprising the steps of providing a casting mold assembly comprising a casting mold with an inner wall, a casting core that is received within the inner wall of the casting mold to leave a casting space between an outer wall of the casting core and the inner wall of the casting mold, wherein the casting space defines a portion of the hollow airfoil, and a standoff spacer that prevents the casting core from contacting the inner wall of the casting mold and thereby maintains the casting space;

casting a nickel-base superalloy casting alloy having a casting alloy solidus temperature into the casting space and solidifying the cast nickel-base superalloy to form the hollow airfoil;

separating the hollow airfoil from the casting mold assembly;

identifying the presence of a through hole extending through a wall of the hollow airfoil that is present due to the standoff spacer; and, if there is a through hole present, welding the through hole by closing the through hole with a weld alloy different from the casting alloy and having oxidation resistance and coating compatibility at least as good as that of the casting alloy, and having a weld alloy solidus temperature in the range of from 150° F. below the casting alloy solidus temperature to 30° F. above the casting alloy solidus temperature, without using any freestanding closure element.

20. The method of claim 19, including an additional step, performed after the step of welding, of applying a coating overlying the casting alloy and overlying the weld alloy.

* * * * *